United States Patent [19]
Hoepken

[11] Patent Number: 5,736,695
[45] Date of Patent: Apr. 7, 1998

[54] DEVICE FOR DETECTING POSITION

[75] Inventor: Hermann Hoepken, Sprockhovel, Germany

[73] Assignee: K.A. Schmersal GmbH & Co., Wuppertal, Germany

[21] Appl. No.: 507,574

[22] Filed: Jul. 26, 1995

[30] Foreign Application Priority Data

Jul. 28, 1994 [DE] Germany ............... 44 26 793.2

[51] Int. Cl.$^6$ ........................................... B66B 1/34
[52] U.S. Cl. ........................................... 187/394; 367/124
[58] Field of Search ................. 187/394; 367/124, 367/126, 127

[56] References Cited

U.S. PATENT DOCUMENTS

| | | | |
|---|---|---|---|
| 4,012,588 | 3/1977 | Davis et al. | 178/18 |
| 4,041,495 | 8/1977 | Martin | 343/112 R |
| 4,238,844 | 12/1980 | Ueda et al. | 367/117 |
| 4,375,057 | 2/1983 | Weise et al. | 340/21 |
| 4,392,214 | 7/1983 | Marini et al. | 367/127 |
| 5,207,297 | 5/1993 | Beattie et al. | 187/394 |
| 5,223,680 | 6/1993 | Schmidt-Malkau et al. | 187/394 |
| 5,306,882 | 4/1994 | Gerwing et al. | 187/394 |
| 5,509,505 | 4/1996 | Steger et al. | 187/394 |

FOREIGN PATENT DOCUMENTS

| | | |
|---|---|---|
| 0 022 363 | 4/1980 | European Pat. Off. . |
| 3208747 | 9/1983 | Germany . |
| 91 16 466 U | 1/1993 | Germany . |

*Primary Examiner*—Robert Nappi
*Attorney, Agent, or Firm*—Alix, Yale & Ristas, LLP

[57] ABSTRACT

The position of an object which is moved along a prescribed path, for example an elevator cage, is continuously and accurately monitored by coupling an acoustic signal generator carried by the object to an acoustic signal conductor which extends along the path, the acoustic signal conductor being characterized by the velocity of sound propagation therealong being uniform and constant. The position of the object is calculated by processing signals generated by transducers located at the opposite ends of the acoustic signal conductor, the signal processing determining the delay between receipt of a sound signal originating at the object at the opposite ends of the conductor.

20 Claims, 1 Drawing Sheet

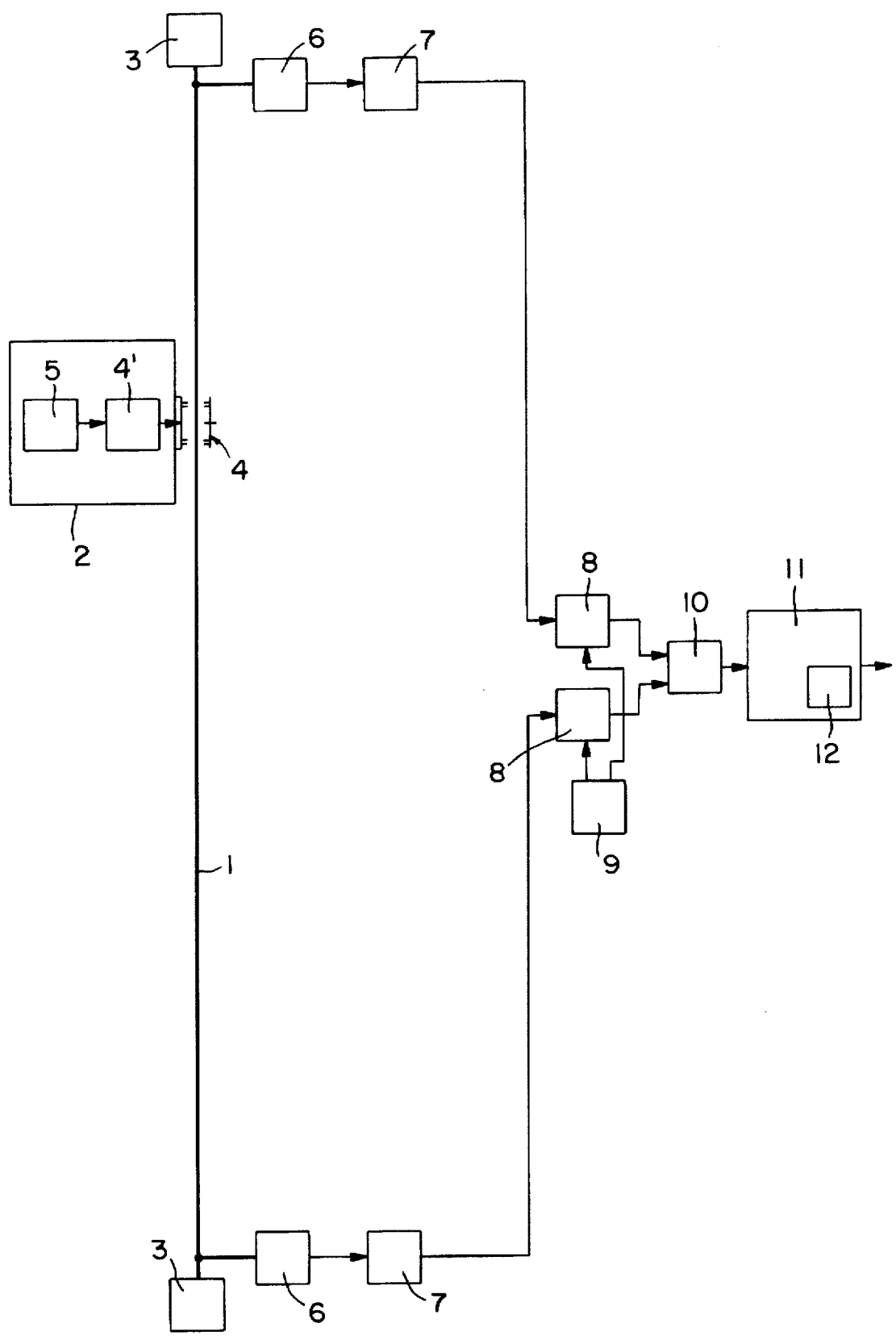

5,736,695

DEVICE FOR DETECTING POSITION

BACKGROUND OF THE INVENTION

1. Field of the Invention

This invention relates to the determination of the position of a movable object and, particularly, to accurately locating an object which is constrained to move reciprocally along a substantially linear path. More specifically, the present invention is directed to a device for detecting the position of an object which can be moved along a prescribed path and, especially, to a acoustical position monitoring system for measuring the vertical location of a elevator cage or the like. Accordingly, the general objects of the present invention are to provide novel and improved methods and apparatus of such character.

2. Description of the Prior Art

The need to and techniques for accurately determining the position of objects such as elevator cages which move along a prescribed path are well known. Thus, German patent publication U 9 116 466 discloses a device for detecting the position of such an object through comparison of the phase of an alternating signal transmitted to the object with the phase of a signal received from the object, the signal transmission path constituting the air in the space between the transmitter and object. The technique of German patent publication U-9 116 466 has the disadvantage that compensation must continually be made for changing environmental conditions.

Published German Patent Application No. 3,208,747 discloses a further device for detecting the position of an object, namely a vertically movable load on a lifting frame, which may be moved along a prescribed path. In the technique of German Application 3,208,747 the propagation times of transmitted ultrasonic signals are evaluated to determine position. Specifically, the position of the object is calculated from three parallel measurement paths, the ambient atmosphere constituting the signal transmission medium. The technique described in German Application 3,208,747 is rather complicated and requires relatively expensive apparatus.

U.S. Pat. No. 4,392,214 discloses a method for determining the location of foreign bodies in a conduit. In the technique of U.S. Pat No. 4,392,214, the propagation time difference, to two spaced-apart receiver transducers, of sound waves generated in the conduit is evaluated. Here again, the technique and the apparatus by which it is implemented are complex and thus expensive.

SUMMARY OF THE INVENTION

The present invention overcomes the above-briefly described and other deficiencies and disadvantages of the prior art by providing a novel technique for simply and accurately determining the position of an object which undergoes reciprocating motion along a known path. The invention also encompasses apparatus for use in the implementation of this novel technique.

Apparatus in accordance with a preferred embodiment of the invention includes a signal generator which is mounted on the object of interest. This signal generator includes means for inducing, in a medium characterized by a uniform sound propagation speed, acoustical signals which travel both in the direction in which the object is travelling and in the opposite direction. In the case where the object is an elevator cage, the signal transmission medium which exhibits the uniform sound propagation speed may be a cable or rail connected to the elevator and the signal generator will include an signal input coupler for launching the generated acoustical signal along the cable or rail. Output signal couplers are positioned adjacent the opposite ends of the signal transmission medium for transducing received acoustic signals into electrical signals. Each of the output signal couplers is connected to a counter, the counters operating under the control of a clock generator. The counters will store numbers commensurate with the transmission time of the propagated information bearing signal to respective opposite ends of the travel path of the object. The information stored in the counters during each measurement cycle will be compared and the sign and magnitude of the difference will be an accurate indication of the position of the object with respect to the midpoint of its travel path.

BRIEF DESCRIPTION OF THE DRAWING

The present invention may be better understood and its numerous objects and advantages will become apparent to those skilled in the art by reference to the accompanying drawing which is a block diagram of apparatus in accordance with the invention.

DESCRIPTION OF THE DISCLOSED EMBODIMENT

With reference to the drawing, an object which moves along a prescribed, linear path between a pair of oppositely disposed limit positions is indicated generally at 2. For purposes of explanation of the present invention, object 2 may be considered to be the "cage" of an elevator. Object 2 is caused to move, by means not shown in the drawing, along an acoustic signal conductor 1. Conductor 1 may, for example, comprise a steel rail or a wire rope which extends along the path of movement of object 2. The acoustic signal conductor 1 is characterized by having a known, uniform sound propagation speed. The opposite ends of the conductor 1 are clamped and/or held in a damped manner. In the drawing, the means for holding the opposite ends of conductor 1 are represented by damping clamps 3.

Means for generating an acoustic reference signal, and causing that signal to be propagated along conductor 1, are carried by the movable object 2. Thus, object 2 supports a signal generator 5 which may be in the form of an oscillator. The object 2 also carries a coupling device 4 which transduces the electrical signal provided by oscillator 5 into an acoustic signal, coupling device 4 being supported from object 2 so as to be operatively associated with conductor 1. An impedence matching circuit 4' interfaces the signal generator 5 with the coupler 4. The coupler 4 may, for example, be an inductive device. The signal to be coupled into conductor 1, and subsequently propagated therealong can, for example, take the form of a pulse, a pulse train or a periodic signal which is characterized by a frequency shift. In the practice of the invention, the time interval between coupling of successive signals into conductor 1 will be chosen so as to be greater than the time required for an information bearing signal commensurate with the output of signal generator 5 to travel the entire length of conductor 1. Accordingly, sychronization between the position or movement of object 2 and the signal propagation along conductor 1 is not required.

An output signal coupler 6 is located adjacent each end of conductor 1. The output signal couplers 6 transduce the received information-bearing acoustic signals into electrical signals. While preferably being piezoelectric devices, couplers 6 may be inductive or capacitive transducers of a type known in the art.

The signals provided by the output signal couplers 6 are transmitted, via respective matching circuits 7, to associated counters 8. The counters 8 synchrononously record pulses generated by a clock generator 9. The clock time of generator 9 is considerably lower than the propagation time of sound from one end of conductor 1 to the other and is selected in accordance with the desired measurement path resolution.

Counters 8 have output terminals connected to a subtraction circuit 10. The instantaneous valve stored in the counters is delivered to subtraction circuit 10 in response to receipt of a signal from the associated coupler 6. Subtraction circuit 10, accordingly, provides a numerical output signal commensurate with the time delay between the arrival of the signals generated by the two output couplers 6. Both the magnitude and sign of the output of circuit 10 are processed in an evaluation circuit 11 which may comprise a microprocessor.

If the movable object 2 is located at the midpoint of the conductor 1, i.e., equidistant from the output signal couplers 6, the numbers stored in counters 8 will be simultaneously delivered to subtraction circuit 10 and no difference signal will appear at the output of the subtraction circuit. If object 2, in the case of a vertical movement path, is located above the midpoint of conductor 1, the number stored in the counter 8 which is connected to the upper coupler 6 will be smaller at the time it is delivered to circuit 10 than will be the number stored in the counter 8 connected to the lower coupler 6 when it is read out to the subtraction circuit. Accordingly, subtraction circuit 10 will provide, at its output, a numerical signal commensurate with the propagation time difference of an acoustic signal which has traveled along conductor 1 to the couplers 6. Since the speed at which sound will travel along conductor 1 is known and constant under normal operating conditions, the difference information appearing at the output of subtraction circuit 10 may be converted into a measure of the distance of object 2 from the midpoint of conductor 1. The sign of the difference signal will, of course, be a function of the side of the midpoint of conductor 1 from which the acoustic signal was propagated. Accordingly, the microprocessor 11 can easily provide an output signal which corresponds to the exact instantaneous positon of object 2 along its motion path. This position information signal may, for example, be used for tracking control.

A "watchdog" circuit 12 may be associated with the signal processing circuitry 11 in order to monitor the operation of the position detector. As described above, in the case of input signal coupling into an acoustic transmission medium 1 which has sound transmission characteristics which are substantially constant over time, the difference signal appearing at the output of subtraction circuit 10 will never exceed a maximum under normal operating conditions. In the case of a fault, a condition which causes significant damping of the signal propagated along conductor 1 for example, the difference determined by subtraction circuit 10 may exceed the predetermined maximum value. Under such circumstances, the watchdog circuit 12 will trigger an alarm.

In an example where the conductor 1 is comprised of steel, the propagation velocity of sound therein will be approximately 5300 m/s. In the case of a time resolution of 188 ns, for which a clock generator frequency of 5.3 MHz is necessary, the location resolution along the measurement path is about 1 mm.

While a preferred embodiment has been shown and described, various modifications and substitutions may be made thereto without departing from the spirit and scope of the invention. Accordingly, the present invention has been described by way of illustration and not limitation.

What is claimed is:

1. Apparatus for providing an indication of the instantaneous position of an object which is caused to move along a prescribed path, the path having a pair of displaced opposite ends, said apparatus comprising:

an acoustic signal conductor extending along said path, said acoustic signal conductor being characterized by the velocity of propagation of sound therein being uniform and constant under normal operating conditions;

first transducer means associated with said acoustic signal conductor for generating an electrical signal in response to the sensing of an acoustic signal propagated along said conductor, said first transducer means being located in proximity to a first end of said path;

second transducer means associated with said acoustic signal conductor for generating an electrical signal in response to the sensing of an acoustic signal propagated along said conductor, said second transducer means being located in proximity to the second end of said path;

means for generating clock pulses at a first preselected frequency;

means mounted on the object for periodically generating acoustic signals and coupling said signals into said conductor, said acoustic signal generating means including an electrical signal generator for generating electrical signals, said acoustic signal generating means operating independently of said transducer means and said clock pulse generating means, the interval between consecutive of said generated acoustic signals being greater than the propagation time of an acoustic signal from one end of said path to the other, said acoustic signals being propagated simultaneously towards both ends of said path from the object whereby said acoustic signals will be received at said first and second transducer means;

first counter means responsive to said clock pulses and to said electrical signals generated by said first transducer means, said first counter means operating independently of said electrical signals generated by said electrical signal generator, counting said clock pulses and providing an output commensurate with the count stored therein;

said counter means responsive to said clock pulses and to said electrical signals generated by said second transducer means, said second counter means operating independently of said electrical signals generated by said electrical signal generator, counting said clock pulses and providing an output commensurate with the count stored therein;

subtraction means connected to said counter means and receiving said outputs provided thereby, said subtraction circuit means providing an output signal having a value which is commensurate with the difference in the time of receipt by said transducer means of an acoustic signal propagated along said conductor from the object; and means responsive to the magnitude and sign of the output signal provided by said subtraction circuit means for providing an indication of the instantaneous position of the object along said path.

2. The apparatus of claim 1 wherein said first frequency is selected as a function of the desired path resolution.

3. The apparatus of claim 1 wherein each of said transducer means includes a piezoelectric sensor coupled to said acoustic signal conductor.

4. The apparatus of claim 2 wherein each of said transducer means includes a piezoelectric sensor coupled to said acoustic signal conductor.

5. The apparatus of claim 1 wherein each of said transducer means comprises a capacitive sensor coupled to said acoustic signal conductor.

6. The apparatus of claim 2 wherein each of said transducer means comprises a capacitive sensor coupled to said acoustic signal conductor.

7. The apparatus of claim 1 wherein each of said transducer means comprises an inductive sensor coupled to said acoustic signal conductor.

8. The apparatus of claim 2 wherein each of said transducer means comprises an inductive sensor coupled to said acoustic signal conductor.

9. The apparatus of claim 1 wherein said acoustic signal conductor comprises a metallic body which extends along said path.

10. The apparatus of claim 9 wherein said metallic body comprises a rail.

11. The apparatus of claim 9 wherein said metallic body comprises a wire rope.

12. The apparatus of claim 9 wherein said first frequency is selected as a function of the desired path resolution.

13. The apparatus of claim 12 wherein each of said transducer means includes a piezoelectric sensor coupled to said acoustic signal conductor.

14. The apparatus of claim 12 wherein each of said transducer means comprises a capacitive sensor coupled to said acoustic signal conductor.

15. The apparatus of claim 12 wherein each of said transducer means comprises an inductive sensor coupled to said acoustic signal conductor.

16. The apparatus of claim 1 wherein said electrical signal generator comprises an oscillator, said oscillator producing electrical signals commensurate with the acoustic signals to be propagated along said acoustic signal conductor; and wherein said means for generating an acoustic signal further comprises an inductive coupler for converting said oscillator electrical signals into acoustic signals and for causing said acoustic signals to be propagated along said acoustic signal conductor.

17. The apparatus of claim 12 wherein said electrical signal generator comprises an oscillator, said oscillator producing electrical commensurate with the acoustic signals to be propagated along said acoustic signal conductor; and wherein said means for generating an acoustic signal further comprises an inductive coupler for converting said oscillator electrical signals into acoustic signals and for causing said acoustic signals to be propagated along said acoustic signal conductor.

18. The apparatus of claim 1 further comprising:

means for generating an alarm signal when the output signal provided by said subtraction circuit means is indicative of the object being displaced from the midpoint of said path by more than a predetermined distance.

19. The apparatus of claim 17 further comprising:

means for generating an alarm signal when the output signal provided by said subtraction circuit means is indicative of the object being displaced from the midpoint of said path by more than a predetermined distance.

20. The apparatus of claim 1 wherein the object is a lift cage.

* * * * *

UNITED STATES PATENT AND TRADEMARK OFFICE
CERTIFICATE OF CORRECTION

PATENT NO.   : 5,736,695
DATED        : April 7, 1998
INVENTOR(S)  : Hermann Hoepken It is certified that error appears in the above-identified patent and that said Letters Patent is hereby corrected as shown below:

Column 6, line 12, after "electrical" insert --signals--.

Signed and Sealed this

Fifteenth Day of December, 1998

Attest:

BRUCE LEHMAN

*Attesting Officer*   *Commissioner of Patents and Trademarks*